(12) United States Patent
Kennedy

(10) Patent No.: US 9,930,407 B2
(45) Date of Patent: Mar. 27, 2018

(54) SYSTEMS AND METHODS FOR DETERMINING USER POSITION VIA WIRELESS SIGNAL CHARACTERISTICS

(71) Applicant: DISH Network L.L.C., Englewood, CO (US)

(72) Inventor: John T. Kennedy, Denver, CO (US)

(73) Assignee: DISH NETWORK LLC, Englewood, CO (US)

( * ) Notice: Subject to any disclaimer, the term of this patent is extended or adjusted under 35 U.S.C. 154(b) by 0 days.

(21) Appl. No.: 15/209,396

(22) Filed: Jul. 13, 2016

(65) Prior Publication Data

US 2016/0337699 A1   Nov. 17, 2016

Related U.S. Application Data

(63) Continuation of application No. 12/344,359, filed on Dec. 26, 2008, now abandoned.

(51) Int. Cl.
*H04N 21/45*   (2011.01)
*H04N 21/2343*   (2011.01)
(Continued)

(52) U.S. Cl.
CPC ........ *H04N 21/4524* (2013.01); *H04H 60/51* (2013.01); *H04H 60/65* (2013.01);
(Continued)

(58) Field of Classification Search
None
See application file for complete search history.

(56) References Cited

U.S. PATENT DOCUMENTS

| | | | |
|---|---|---|---|
| 2001/0033600 A1* | 10/2001 | Yang ............... | H01Q 1/246 375/130 |
| 2003/0145328 A1* | 7/2003 | Rabinowitz ......... | G01S 5/0036 725/72 |

(Continued)

FOREIGN PATENT DOCUMENTS

WO     20080127071 A1    10/2008

OTHER PUBLICATIONS

European Patent Office, International Searching Authority, "International Search Report," dated Apr. 21, 2010 for International Application PCT/US2009/067146 filed Dec. 8, 2009.

(Continued)

*Primary Examiner* — Justin Shepard
(74) *Attorney, Agent, or Firm* — Lorenz & Kopf LLP

(57) ABSTRACT

Systems and methods are described for presenting a television program to a viewer using a mobile television receiver. The television program is received at the mobile television receiver via a first signal transmitted by a signal source having a limited range. It is determined whether the mobile receiver will exit the limited range of the signal source and, before the mobile receiver exits the limited range of the signal source, an action is facilitated to allow the viewer to continue to view the television program. Actions that may be facilitated include tuning to an alternate source of the television program, obtaining a placeshifted media stream of the television program, recording the television program on a remote video recorder, or simply notifying the viewer that he or she is about to exit the limited range of the signal source.

20 Claims, 3 Drawing Sheets

Figure 1:
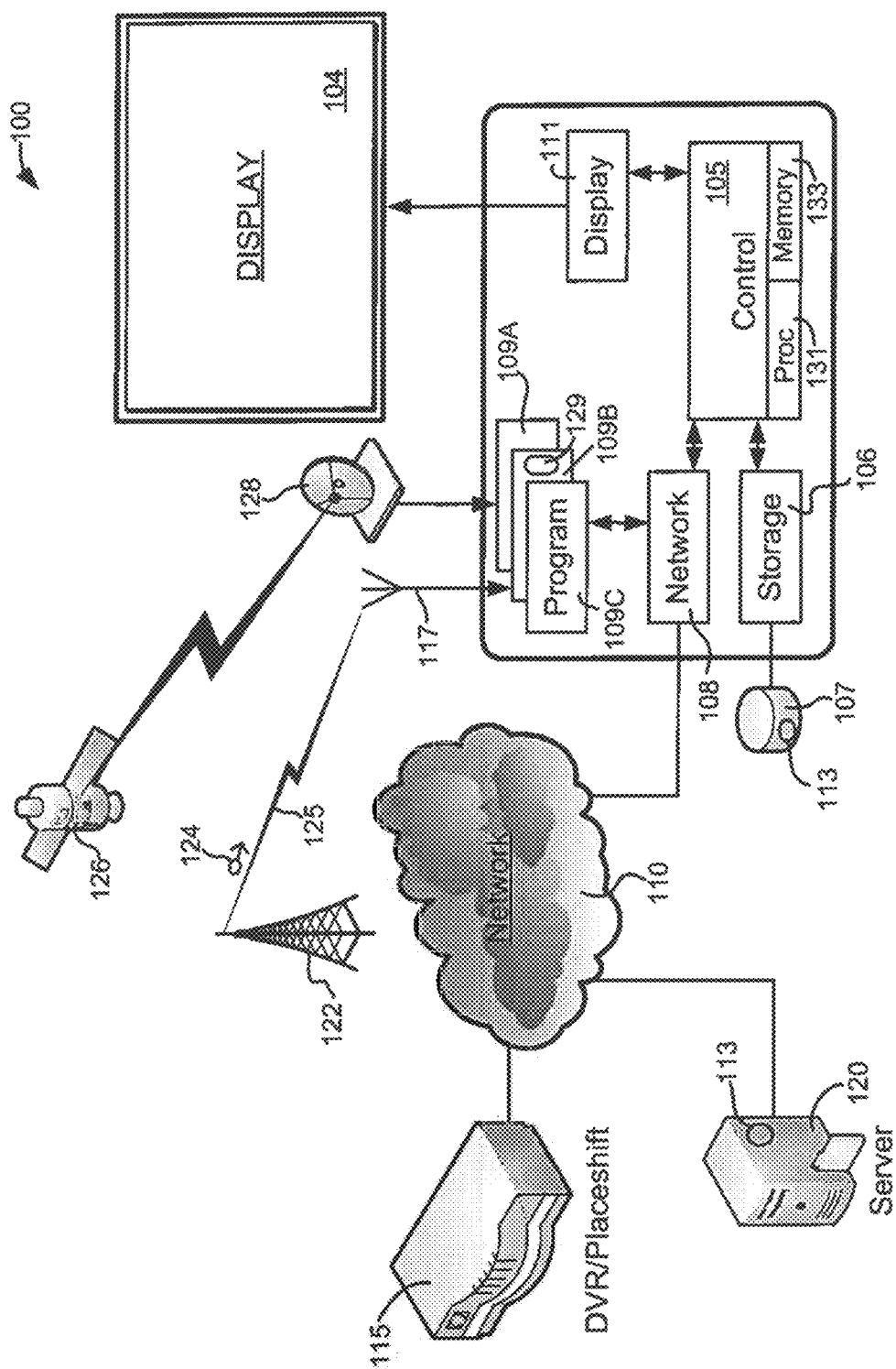

(51) Int. Cl.

| | | |
|---|---|---|
| *H04N 21/61* | (2011.01) | |
| *H04N 21/214* | (2011.01) | |
| *H04N 21/20* | (2011.01) | |
| *H04N 21/24* | (2011.01) | |
| *H04N 21/25* | (2011.01) | |
| *H04N 21/234* | (2011.01) | |
| *H04N 21/21* | (2011.01) | |
| *H04N 21/258* | (2011.01) | |
| *H04N 21/60* | (2011.01) | |
| *H04N 21/23* | (2011.01) | |
| *H04H 60/51* | (2008.01) | |
| *H04H 60/65* | (2008.01) | |
| *H04N 21/41* | (2011.01) | |
| *H04N 21/433* | (2011.01) | |
| *H04N 21/442* | (2011.01) | |
| *H04H 20/22* | (2008.01) | |
| *H04H 60/11* | (2008.01) | |
| *H04H 60/27* | (2008.01) | |

(52) U.S. Cl.
CPC ............ *H04N 21/20* (2013.01); *H04N 21/21* (2013.01); *H04N 21/214* (2013.01); *H04N 21/2146* (2013.01); *H04N 21/23* (2013.01); *H04N 21/2343* (2013.01); *H04N 21/23424* (2013.01); *H04N 21/24* (2013.01); *H04N 21/2402* (2013.01); *H04N 21/25* (2013.01); *H04N 21/25841* (2013.01); *H04N 21/4126* (2013.01); *H04N 21/4334* (2013.01); *H04N 21/442* (2013.01); *H04N 21/60* (2013.01); *H04N 21/61* (2013.01); *H04N 21/6112* (2013.01); *H04N 21/6162* (2013.01); *H04H 20/22* (2013.01); *H04H 60/11* (2013.01); *H04H 60/27* (2013.01)

(56) References Cited

U.S. PATENT DOCUMENTS

| | | | |
|---|---|---|---|
| 2003/0153312 A1* | 8/2003 | Lee | H04W 36/32 455/436 |
| 2006/0061691 A1* | 3/2006 | Rabinowitz | G01S 5/0221 348/625 |
| 2006/0095471 A1 | 5/2006 | Krikorian et al. | |
| 2006/0257123 A1 | 11/2006 | Horozov et al. | |
| 2007/0130606 A1* | 6/2007 | Jeong | H04H 20/12 725/131 |
| 2008/0016542 A1* | 1/2008 | Chozui | H04H 20/26 725/132 |
| 2008/0104653 A1 | 5/2008 | Kim | |
| 2008/0291086 A1 | 11/2008 | Walley et al. | |
| 2008/0311952 A1* | 12/2008 | Sugiyama | H04N 5/50 455/556.1 |
| 2009/0013363 A1* | 1/2009 | Lee | H04H 20/24 725/110 |

OTHER PUBLICATIONS

Wikipedia "Loran", 12 pages, retrieved from the Internet on Dec. 26, 2008.

* cited by examiner

SYSTEMS AND METHODS FOR DETERMINING USER POSITION VIA WIRELESS SIGNAL CHARACTERISTICS

RELATED APPLICATIONS

This application claims the benefit of U.S. application Ser. No. 12/344,359 filed Dec. 26, 2008, which is hereby incorporated by reference.

TECHNICAL FIELD

The following discussion generally relates to media receivers such as set-top boxes, television receivers, media players and/or the like.

BACKGROUND

Most television viewers now receive their home television signals through a content aggregator such as a cable or satellite television provider. In the typical instance, encoded television signals are sent via a cable or wireless data link to the viewer's home, where the signals are ultimately decoded in a set-top box, receiver or similar consumer device. The decoded signals can then be viewed on a television or other appropriate display in the home as desired by the viewer.

As viewers become increasingly mobile, however, a desire arises to make television and other media content more portable. That is, viewers now desire access to television and other programming in automobiles and other vehicles, and in other mobile environments. To provide such access, television signals becoming increasingly available via various sources such as satellite connections, as well as various terrestrial broadcast and other sources. Examples of terrestrial broadcasts include digital (ATSC) telecasts, as well as newer services available on other frequencies, such as the 700 MHz frequency band. Other sources of programming may also be available.

As mobile viewers enjoy programming from one or more of these sources, an issue often arises when the viewer nears the limits of a satellite footprint or broadcast range. As a viewer traverses the limit of a tower-based or other terrestrial signal, for example, a risk can exist that the programming will change or become unavailable if another source of the programming cannot be readily obtained. Local or regional feeds from terrestrial sources, for example, may not be readily available from a satellite source, or other interruptions can occur.

It is therefore desirable to create systems and methods that are able to readily identify potential or actual interruptions and to take remedial action prior to such interruptions. These and other desirable features and characteristics will become apparent from the subsequent detailed description and the appended claims, taken in conjunction with the accompanying drawings and this background section.

BRIEF SUMMARY

According to various exemplary embodiments, systems and methods are described for presenting a television program to a viewer using a mobile television receiver. In some embodiments, the television program is received at the mobile television receiver via a first signal transmitted by a signal source having a limited range. It is determined whether the mobile receiver will exit the limited range of the signal source. This determination may be made, for example, from information contained within one or more received programming signals, from the received signal strength of one or more programming signals, and/or from any other information that may be available. Before the mobile receiver exits the limited range of the signal source, an action is facilitated to allow the viewer to continue to view the television program. Actions that may be facilitated include tuning to an alternate source of the television program, obtaining a placeshifted media stream of the television program, recording the television program on a remote video recorder, or simply notifying the viewer that he or she is about to exit the limited range of the signal source.

In other embodiments, a mobile system is provided for presenting a television program to a viewer on a display. The mobile system comprises a first programming interface configured to receive the television program via a first signal transmitted by a signal source having a limited range, a display interface configured to present the television program to the viewer on the display, and a controller coupled to the first programming interface and to the display interface. The controller is configured to determine whether the mobile system will exit the limited range of the signal source and to facilitate an action to allow the viewer to continue to view the television program prior to the mobile system exiting the limited range of the signal source.

Still other embodiments provide a mobile system for presenting a television program to a viewer on a display that comprises a programming interface, a display interface, a network interface and a controller. The programming interface is configured to receive first, second and third signals transmitted by a first, a second and a third terrestrial broadcast source, respectively, each of the first, second and third signals having a limited range. The display interface is configured to present the television program to the viewer on the display. The network interface configured to transmit and receive information on a digital network. The controller is coupled to the first programming interface, the display interface and the network interface, and is configured to determine a location of the mobile system based upon the first, second and third signals, to select a best source for the television program from the first, second and third signals, to determine whether the mobile system will exit the limited range of the terrestrial broadcast source selected as the best source for the television program, and to facilitate an action to allow the viewer to continue to view the television program prior to the mobile system exiting the limited range of the signal source. In this embodiment the action is selected from one or more of: changing the programming interface to receive the television program from another of the first, second and third signals, notifying the viewer that the mobile system is about to exit the limited range of the terrestrial broadcast source, and/or directing a remotely-located video recorder via the network interface to record at least a portion of the television program.

Various embodiments, aspects and other features are described in more detail below.

BRIEF DESCRIPTION OF THE DRAWING FIGURES

Figure 2:
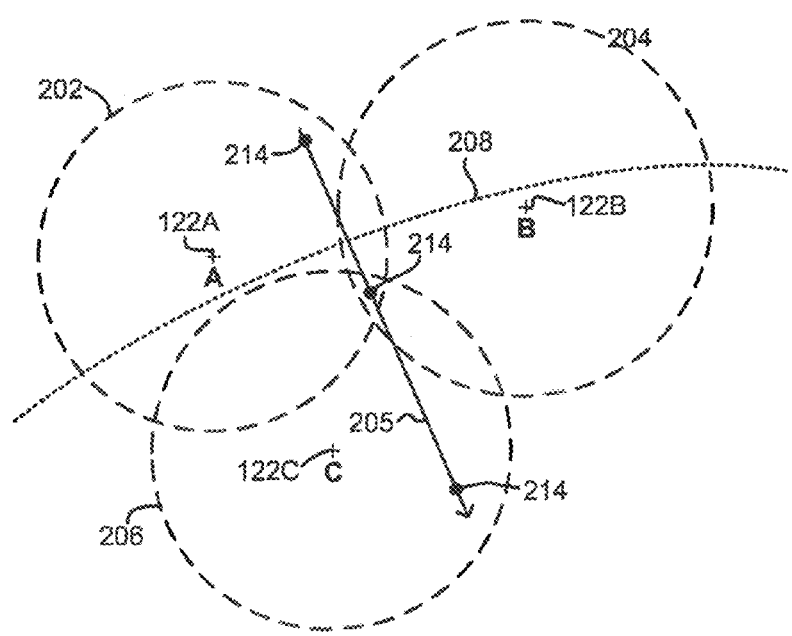
Figure 3:
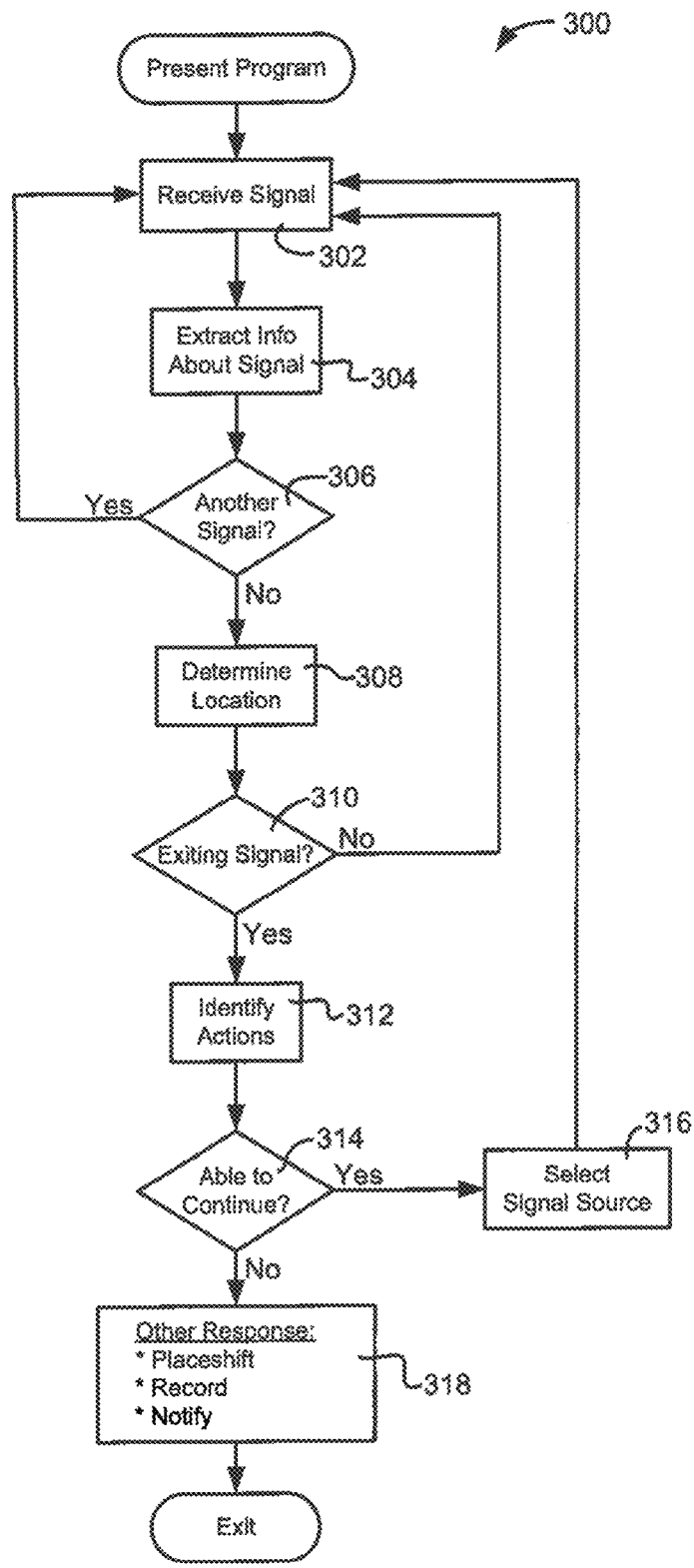

Exemplary embodiments will hereinafter be described in conjunction with the following drawing figures, wherein like numerals denote like elements, and FIG. 1 is a block diagram of an exemplary system for providing viewing of a television program;

FIG. 2 is a diagram showing a technique for determining whether a limited range of a signal source is being exited; and FIG. 3 is a flowchart of an exemplary process for providing viewing of a television program.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a mobile set-top box (STB), television receiver and/or similar mobile device is able to identify when a signal source is nearing its broadcast limits, and take an appropriate action before losing the signal so that the viewer does not miss out on the television programming that he or she is viewing. Examples of actions that can be taken include, without limitation, switching to an alternate source for the programming, obtaining the content via a media stream (e.g., from a remotely located placeshifting device), directing a remotely-located video recorder to record the remainder of the program, and/or simply providing a notification to the viewer that he or she is leaving the limited range of the programming source.

The determination as to whether the mobile receiver will exit the limited range of the programming source can be made in any manner. In various embodiments, a location and/or movement vector of the mobile receiver can be determined with respect to one or more broadcast sources. This information may be compared to a look-up table or other database stored within the receiver device to identify the limits of the programming source. Location information may be determined from information encoded within the broadcast signal, from the signal strength of the received signal, from a global positioning system (GPS) and/or in any other manner.

Turning now to the drawing figures and with initial reference to FIG. 1, an exemplary system 100 for providing television or other media content to a viewer suitably includes a mobile receiver system 102 that allows viewing of television or other media content received from one or more sources on a display 104. Various sources of content may include any sort of terrestrial broadcast source 122, satellite broadcast source 126, network source 120 and/or the like. Generally speaking, receiver system 102 is able to receive signals from one or more sources, to determine whether the system 102 is about to exit a limited range of the currently-selected source, and to take an appropriate action before leaving the limited range, as described more fully herein.

For example, in the case of a terrestrial broadcast source 122, mobile receiver system 102 may be operable to receive a signal 125 from a tower or other source having a limited transmission range. Mobile system 102 may be operable to identify when the location of the mobile system 102 is about to exit the limited broadcast range of signals 125. This may be accomplished, for example, by decoding location information 124 contained within signal 125 (and within other signals similarly obtained from other broadcast sources) to allow a position to be triangulated using, for example, conventional long range aid to navigation (LORAN) techniques. For example, information 124 may provide an identifier that specifies the geographic location of the transmitting tower 122. Further, the signal strength of the received signal may be monitored over time and/or compared to received signals of other terrestrial-based signal sources to identify a movement vector of the mobile system 102. Alternatively, the position of the mobile system 102, may be determined using any known navigational system including, but not limited to, those using the United States Global Positioning System (GPS), differential GPS systems, the European Union's Magellan system, combinations of the foregoing and the like. By establishing a position of system 102 with respect to one or more sources 122 and a movement of direction (e.g., based upon changes in received signal strength over time), the location of the mobile system 102 with respect to the limits of the transmit range can be identified. This information can, in turn, be used to take any number of appropriate actions so that the viewer's enjoyment of a particular program is preserved even though the viewer may be leaving the usual broadcast range of the programming source.

To that end, mobile receiver system 102 (also referenced herein as simply "system 102") is any type of set-top box (STB), satellite receiver, cable receiver, broadcast receiver, media player and/or other device capable of presenting media signals to a viewer on a display 104. In the exemplary embodiment shown in FIG. 1, system 102 suitably includes a controller 105 that interacts with one or more programming interfaces 109A-C, a network interface 108, a display interface 110, and/or a storage interface 106 to present imagery to the viewer on display 104.

Controller 105 is any sort of microprocessor, microcontroller, digital signal processor or other logic capable of directing the actions and processes of system 102. In various embodiments, system 102 is based upon a "system on chip" (SoC) implementation that incorporates a hybrid microcontroller 131 with memory 133, input/output and other features to perform the various signal processing and other actions of system 102. Various SoC and other integrated hardware implementations are available from Texas Instruments, Conexant Systems, Broadcom Inc., and many other suppliers as appropriate. Other embodiments may implement controller 105 and/or the other features of system 102 with any number of discrete and/or integrated processing components (e.g., any sort of microprocessor or microcontroller 131), memories 133, input/output features and/or other features as desired.

Programming interfaces 109A-C are any hardware and/or software receivers, demodulators or other interfaces capable of receiving television or other media programming as desired. In various embodiments, programming interfaces 109A-C include one or more a satellite, cable or broadcast television receivers, although other embodiments may alternately or additionally provide interfaces to a digital video recorder (DVR), digital versatile disk (DVD), network no and/or any other media sources. In the exemplary embodiment illustrated in FIG. 1, interface 109A is a satellite interface that receives programming via an antenna 128 that is capable of receiving broadcast transmissions from one or more satellite sources 126. Such satellite sources 126 might include low-earth orbit (LEO) connections such as the TERRASTAR satellite cluster, higher-orbit direct broadcast satellite (DBS) connections and/or the like. FIG. 1 also shows a terrestrial interface 109B to a conventional antenna 117 that is capable of receiving signals 125 from any terrestrial broadcast source 122. Source 122 in this example may be any sort of digital, analog or other broadcast source, including any sort of conventional ATSC broadcast source, any sort of 3G or 4G cellular signal, and/or any source operating on any other frequency (e.g., the 700 MHz frequency band). FIG. 1 also shows a programming interface 109C that communicates with network interface 108 to reflect that programming may be received over network no in some embodiments, as described more fully below. Alternate embodiments may provide any number of programming interfaces 109A-C (including a single interface) to any type of terrestrial, satellite, network and/or other programming sources as desired.

Programming interfaces 109A-C may be logically and/or physically combined with controller 105 in various embodiments, as appropriate. One or more programming interfaces 109A-C may be implemented using conventional decoder software executing on processor 131, for example, without the need for specific external hardware. Other embodiments may provide appropriate electrical and/or signaling interfaces (e.g., antenna interfaces and/or the like) to connect to antennas, external receiver/decoder devices, and/or other components as desired.

Network interface 108 is any sort of physical, logical and/or other interface to network 110. In various embodiments, network interface 108 includes a conventional wireless, telephone and/or other network adapter (e.g., a conventional network interface card (NIC) or the like). Interface 108 allows system 102 to communicate via any sort of wireless or other "back channel" with a server 120, with a home receiver 115, and/or any other devices or systems as desired. In various embodiments, the network interface 108 may be combined with (or may otherwise interface with) one or more programming interfaces 109 in the sense that media programming may be received over network 110, as desired. Further, communications may be transmitted to network no via other channels (e.g., LEO or other satellite connections) in place of or in addition to conventional wireless or other networking interfaces 108. Still other embodiments may not include a back channel and may only provide local data processing, in which case network interface 108 may not be needed or present.

Network no is any digital or other communications network capable of transmitting messages between senders (e.g., system 102) and receivers (e.g., server 120). In various embodiments, network no includes any number of public or private data connections, links or networks supporting any number of communications protocols. Network no may include the Internet, for example, or any other network based upon TCP/IP or other conventional protocols. In various embodiments, network no could alternately or additionally incorporate a wireless and/or wired telephone network, such as a cellular communications network for communicating with mobile phones, personal digital assistants, and/or the like, (e.g., any sort of GSM/EDGE or CDMA/EVDO connection, any sort of 3G, 4G, WiMax or subsequent telephone link, and/or the like). Network no may also incorporate any sort of wireless or wired local area networks, such as one or more IEEE 802.3 and/or IEEE 802.11 networks. Various embodiments may provide different features that make use of different types of networks 110, as described more fully below.

Display interface 110 is any physical and/or logical interface to display 104. Some types of systems 102 may incorporate a built-in display 104, such as the display in a laptop or other portable computer, a mobile phone, a personal digital assistant, a heads-up display, an integrated television receiver, and/or the like. In other embodiments wherein system 102 provides video output signals to an external display 104, such signals may be provided in any compatible format, such as component video, S-video, High-Definition Multimedia Interface (HDMI), Digital Visual Interface (DVI), IEEE 1394, and/or any other formats as desired.

Storage interface 106 is any sort of physical, logical and/or other interface to any type of internal or external storage device 107. In various embodiments, the storage device 107 is a conventional disk drive, although other embodiments may provide mass storage in the form of flash or other memory, optical storage and/or the like. To that end, storage interface 106 may be any sort of conventional serial, parallel or other interface (e.g., peripheral component interconnect (PCI), universal serial bus (USB) and/or the like) capable of facilitating communications between controller 105 and any sort of internal or external storage 107. Storage devices 107 accessed via interface 106 may be used to store programming (e.g., as part of a DVR feature provided by system 102), programming instructions executed by controller 105, data (including data associated with various broadcast sources 122), and/or other information as appropriate.

In operation, then, system 102 determines whether it will exit the limited range of a currently-received signal source in any manner. In various embodiments, this feature is most relevant when programming is being received via a terrestrial source 122, although it could also apply to programming received via a spot-beam or other limited coverage signal from a satellite 126. Generally, this can be accomplished by identifying when the mobile system 102 is about to reach the limit of the currently-selected broadcast source. This limit, in turn, can be identified by determining a position of the mobile system 102 with respect to a source 122 of the received signal 125. As noted above, for at least one embodiment, the position of the mobile system 102 can be determined from information 124 contained within the received signal 125. This information could provide a location (e.g., with respect to latitude/longitude or other coordinates) of the transmitting source 122, or could simply provide an identifier that can be cross-referenced to a lookup table or other database 113 of information. Such information may be locally stored (e.g., in memory 133 or storage medium 107), and/or may be accessed via network 110 from a remote server (e.g., server 120).

Mobile system 102 may communicate on network 110 in any manner. In various embodiments, at least some of the data processed within system 102 is stored remotely on a server 120 that is accessible via network 110. Such information may include the location database 113 in some embodiments. Moreover, mobile system 102 may be able to communicate with a home receiver or similar device 115 via network 110. In various embodiments, device 115 is a conventional set-top box or other receiver-type device that is located in a viewer's home, or at any other location. Such as device 115 may include the ability to receive television programming via terrestrial broadcasts, cable, satellite and/or any other source, and may also provide conventional digital video recording (DVR) and/or placeshifting capabilities as desired. Mobile system 102 may locate device 115 on network 110 using an internet protocol (IP) or other address, which may be obtained in some embodiments from any sort of server 120 or the like. As noted above, mobile system may obtain programming content from device 115, server 120 and/or any other source on network 110 in various embodiments.

In at least one embodiment, to determine a location of mobile system 102, signals 125 would typically be received from multiple (e.g., three or more) different broadcast sources 122 to allow for triangulation of a location from the received signals. This triangulation typically occurs based upon time delays in signals received from different sources. In the conventional LORAN-type technique, a signal broadcast from a primary source would be re-broadcast from two or more secondary sources to allow computation of time delays therebetween. In other embodiments, received signal strength may be used to ascertain approximate distances from the transmitter source 122, and/or to determine if the mobile system 102 is approaching or moving away from the source 122. Received signal strength may be determined from a conventional receive signal strength indicator (RSSI) feature 129 contained within one or more programming interfaces 109A-C, and/or within controller 105. In still other embodiments, mobile system 102 determines its position using a conventional inertial navigation system, global positioning system and/or the like. Further, it is to be appreciated that based upon a given received signal strength at any given location and based upon information identifying where "holes" or drops in the perceived signal strength are likely occur with respect to any given transmitter, the mobile system 102 can make intelligent decisions as to switching options, if any are available, user warnings, automatic back-up/recording options and/or the like. For example, a mobile system 102 that is receiving a terrestrial ATSC signal could be moving towards a geographic area, for example a valley, at which the digital signal strength "falls-off" and thus, is not available. In such an instance, mobile system 102 could desirably detect this occurrence prior to the event actually occurring and provides options to the user. Similarly, a mobile system 102 receiving a satellite signal could experience a signal interruption upon entering a tunnel, a garage, a dense forest, or other signal obscuring environment. The mobile system 102 is desirably configured to anticipate the same based upon predictive location information and/or actual signal reception information (e.g., a noted loss in the received signal strength) and provide options to the user.

After determining the relative position of the mobile station 102, the limits of the source broadcast range may be determined in any manner. In various embodiments, the limit is simply indicated by a decline in received signal strength or any other indicia of signal quality. In still other embodiments, the limits may be determined based upon the location of the source 122 from mapping information stored in a database 113 or the like, from an expected broadcast radius computed based upon factors contained in database 113 and/or information 124, and/or information from any other source.

Information 124 contained within broadcast signal 125 may also contain information about the program being delivered. Such information may include, for example, an indication as to whether the program is local, regional and/or national in nature. This information could be contained within conventional program formatting (e.g., MPEG, PSIP and/or other formatting), or may be separately inserted as desired.

FIG. 2 shows a diagram 200 that shows a path of a mobile system 102 from point 210 to point 214 along vector 205. This may represent travel along a roadway or other path, for example, or any other sort of movement of mobile system 102. Beginning point 210 lies within the broadcast range 202 of programming source 122A, so a program may be initially acquired from that source. As system 102 moves along vector 205, additional programming signals (which may or may not contain the currently-viewed program) can be received from source 122B, and then source 122C. Programming may also be available within satellite footprint 208 in this example.

When the system reaches point 212 on vector 205, system 102 identifies that it is approaching the limited range of source 122A. This identification may be based upon a comparison of the relative locations and/or directions of system 102 and broadcast source 122A as described above, a recognition that the received signal strength of signal 125 from source 122A is declining, or any other techniques as appropriate. At point 212 in this example, mobile system 102 is able to receive terrestrial programming from sources 122A, 122B and 122C. Mobile system 102 may be able to determine, however, that is leaving the ranges 202 and 204 of sources 122A and 122B, respectively, and/or that it is moving toward source 122C, thereby making source 122C the better terrestrial source for the program. Mobile system 102 may also identify an available satellite source 124 (FIG. 1) with a footprint 208. If the program currently being viewed is available from any of the other terrestrial or other sources, system 102 may automatically select another source for the program, or may prompt the viewer to manually, automatically or semi-automatically (e.g., via a scan function) tune to another source for the programming prior to exiting the effective range 202 of source 122A.

As mobile system 102 continues along vector 205 toward point 214, an additional issue arises when system 102 is about to exit region 206. In this example, there is no apparent terrestrial source able to provide continued programming. System 102 may automatically or manually tune to a satellite-based source, if possible, or take some other action as desired. If the programming is not available from the satellite source (e.g., if the program is local or regional and therefore not carried by the particular satellite providing footprint 208), then other options may be made available to prevent the viewer from missing the remainder of the program.

Such actions may include simply notifying the viewer so he or she can stop moving temporarily until the program is complete. Other actions may include transmitting a message (e.g., via interface 108 and network 110) to a remotely-located digital or analog recording device 115 that instructs the device to record the particular program for later viewing, or to provide a place-shifting media stream over network 110 so that the viewer may continue to enjoy the program. Various techniques for place-shifting are described in U.S. Patent Application Publication No. 2006/0095471 entitled "Personal Media Broadcasting System" filed on Jun. 7, 2005, although other placeshifting techniques could be used in any number of equivalent embodiments.

Turning now to FIG. 3, an exemplary method 300 for presenting programming or other content to a viewer suitably includes the broad steps of receiving television programming signals from one or more sources (functions 302, 306), determining whether the mobile receiver will exit the limited range of a current signal source (function 310), and facilitating an action to allow the viewer to continue to view the television program prior to the mobile system 102 exiting the limited range of the signal source 122 (e.g., any of functions 312-318). Various embodiments additionally determine the location of the mobile system (function 308). Various other functions and other features may also be provided, as described in increasing detail below.

Generally speaking, the various functions and features of method 300 may be carried out with any sort of hardware, software and/or firmware logic that is stored and/or executed on any platform. Some or all of method 300 may be carried out, for example, by logic executing within system 102, server 120 and/or remote device 115 in FIG. 1. In one embodiment, controller 105 and/or processor 131 executes software logic that performs each of the various functions shown in FIG. 2. Such logic may be stored, for example, in memory 133 and/or storage medium 107 prior to and/or during execution. In other embodiments, data processing functions (e.g., function 308) could be executed on server 120 or another platform, with results transmitted to mobile system 102 over network 110. Hence, the particular logic and hardware that implements any of the various functions shown in FIG. 3 may vary from context to context, implementation to implementation, and embodiment to embodiment in accordance with the various features, scenarios and structures set forth herein. The particular means used to implement each of the various functions shown in FIG. 3, then, could be any sort of processing structures that are capable of executing conventional software logic in any format. Such processing hardware may include controller 105, processor 131 and/or or other components of system 102 in FIG. 1, as well as any processors or other components associated with server 120 and/or other systems as appropriate.

As noted above, mobile system 102 is able to receive programming signals from one or more programming source 122 as desired (function 302). Receiving signals in this sense may not require actually tuning to the programming carried on the signal, but may simply involve identifying that the signal is present and able to be received. Mobile system 102 may also extract any useful information about the signal (function 304) as appropriate for location determination purposes as described above. That is, system 102 may extract information 124 from one or more terrestrial signals 125 to be used in determining a location of mobile system 102 with respect to the signal sources 122A-C. Function 304 may additionally or alternatively involve evaluating a received signal strength to ascertain a direction of movement with respect to the signal source 122, and/or to assist in determining distance from the source 122.

Receiving and extracting data may be repeated for any number of signals 125 (function 306) to allow the location of mobile system 102 to be determined (function 308). In various embodiments that determine an exact location of mobile system 102, it may be desirable to obtain signals 125 from three or more sources so that detailed information can be triangulated. In other embodiments, however, more approximate information may be used, without the need for a particular location. That is, it may be sufficient in some embodiments to know that a single signal is degrading, so another source for the program content needs to be found. In other embodiments, location of sources 122 may be obtained from information 124, with the comparative location of system 102 simply obtained from a GPS or inertial reference system. Still other embodiments may use information from a cellular or portion of network no to identify the location of system 102. Additional or alternate information may be processed in any number of equivalent embodiments.

The determination as to whether system 102 is about to exit the limited range of any programming source may be made in any manner (function 310). In various embodiments, the determination is made locally based upon data and programming contained at system 102 (e.g., in controller 105). In other embodiments, location processing is handled at server 120 or the like, which suitably notifies system 102 when it is about to exit a programming region. As noted above, the impending exit from the limited broadcast range may be determined based upon mapping information, relative locations of system 102 and source 112, received strength of signal 125, and/or any other factors as desired.

When system 102 is about to exit the limited range of a signal source that is providing a television program (function 310), any responsive actions (function 312) can be identified and performed in any manner. As noted above, any number of responsive actions may be available to system 102. Such actions may include, for example, prompting the viewer, obtaining the programming from an alternate broadcast, satellite or network source, directing a recorder to record the remainder of the program, or taking other actions as appropriate. In some embodiments, some or all of the available options may be presented to the viewer, who may then select one or more desired actions for system 102 to take.

If another source for the program is available (function 314), the source may be manually or automatically tuned (function 316) as desired. Such a source may be a satellite source, another terrestrial source, a placeshifted media stream from a remote placeshifting device 115 or any other server 120, or the like. In various embodiments, system 102 may need to adjust a resolution or other parameter to accommodate the new source. For example, a high definition signal received in a metropolitan area may not be available in a more rural area, so the viewer and/or system 102 may opt to receive a standard (or lower) definition signal when the high definition signal is no longer available. Other sources may be recognized and selected as appropriate.

Note that in some embodiments, function 314 may involve determining whether a program received on a terrestrial broadcast is available from a satellite or other source (or vice versa). Such embodiments may involve processing information 125 received with signal 124 to determine if the programming is local, regional, national or the like. If such programming is regional, there may be no readily-available national equivalent to be received from the satellite source, thereby making other options more attractive in such cases.

As noted above, other options (function 318) in the event that the programming is no longer available might include, in various embodiments, communicating with a remotely-located device (e.g., device 115 or server 120) to direct the device to record the remainder of the program, to obtain a place-shifted video stream of the program via network 110, or take some other action. In still other embodiments, the viewer is notified that access to the program will end soon, thereby allowing the viewer to stop moving or take another responsive action if he or she desires.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

The invention claimed is:

1. A method of presenting a television program to a viewer using a mobile television receiver, the method comprising:

receiving the television program at the mobile television receiver via a first signal transmitted by a signal source having a limited range;

determining, by a processor of the mobile television receiver, a location of the signal source within the limited range of the signal source, the location comprising a latitude and longitude of the signal source;

determining, by the processor of the mobile television receiver, the limited range of the signal source based upon the determined location of the signal source and an expected broadcast radius of the signal source, the limited range of the signal source defining a geographical outer limit of the signal source and any geographic holes in broadcast coverage within the geographical outer limit of the signal source;

determining, by the processor of the mobile television receiver, a geographic position of the mobile television receiver and a direction of movement relative to the determined location of the signal source;

while receiving the television program via the first signal transmitted by the signal source and while a signal strength of the first signal is above a predetermined threshold, determining, by the processor of the mobile television receiver, whether the mobile television receiver will exit the limited range of the signal source based upon the determined geographic position, the direction of movement relative to the determined location of the signal source and the expected broadcast radius of the signal source; and when it is determined that the viewer will exit the limited range of the signal source, facilitating, by the processor of the mobile television receiver, an action to allow the viewer to continue to view the television program after the viewer exits the limited range of the signal source, wherein the facilitating occurs before the signal strength of the first signal drops below the predetermined threshold.

2. The method of claim 1 wherein the determining the geographic position comprises extracting a first location indicator from the first signal.

3. The method of claim 2 further comprising:
receiving a second signal from a second signal source and a third signal from a third signal source; and
extracting a second location indicator from the second signal and a third location indicator from the third signal;
wherein the geographic position of the mobile television receiver is determined based upon the first, second and third location indicators.

4. The method of claim 3 wherein the determining whether the mobile receiver will exit the limited range of the signal source comprises comparing the geographic position of the mobile receiver to information contained within a database in the mobile receiver.

5. The method of claim 1 wherein the determining the geographic position of the mobile television receiver comprises obtaining the geographic position from a global positioning system.

6. The method of claim 1 further comprising:
receiving a second signal from a second signal source and a third signal from a third signal source.

7. The method of claim 6 further comprising:
computing a movement vector for the mobile receiver based upon the position of the mobile receiver; and
tuning the mobile receiver to a selected one of the first, second and third signals based upon the movement vector.

8. The method of claim 1 wherein the action comprises switching to an alternate signal source for the television program.

9. The method of claim 8 further comprising identifying the alternate signal source from a plurality of potential sources.

10. The method of claim 9 wherein the plurality of potential sources comprises a satellite source and a broadcast source.

11. The method of claim 9 wherein the plurality of potential sources comprises a 700 MHz broadcast source.

12. The method of claim 1 wherein the action comprises notifying the viewer that the mobile receiver is exiting the limited range of the signal source.

13. The method of claim 1 wherein the action comprises directing a remotely-located video recorder to record at least a portion of the television program.

14. The method of claim 1 wherein the action comprises receiving the television program from a remotely-located placeshifting device.

15. A mobile system for presenting a television program to a viewer on a display of the mobile system, the mobile system comprising:
a first programming interface configured to receive the television program via a first signal transmitted by a signal source having a limited range;
a display interface configured to present the television program to the viewer on the display; and
a controller coupled to the first programming interface and to the display interface, wherein the controller is configured to:
determine, while receiving the television program via the first signal transmitted by the signal source and while a signal strength of the first signal is above a predetermined threshold, a geographic position of the mobile system;
determine, while receiving the television program via the first signal transmitted by the signal source and while the signal strength of the first signal is above the predetermined threshold, the limited range of the signal source based upon a location of the signal source within the limited range of the signal source and an expected broadcast radius of the signal source, the limited range of the signal source defining a geographical outer limit of the signal source and any geographic holes in broadcast coverage within the geographical outer limit of the signal source;
determine, while receiving the television program via the first signal transmitted by the signal source and while the signal strength of the first signal is above the predetermined threshold, whether the mobile system will exit the limited range of the signal source based upon the determined geographic position the location of the signal source, a direction of movement relative to the determined location of the signal source and the expected broadcast radius of the signal source; and
facilitate an action to allow the viewer to continue to view the television program before the signal strength of the first signal drops below the predetermined threshold.

16. The mobile system of claim 15 further comprising a second programming interface, and wherein the controller is further configured to obtain the television program via the second programming interface before the mobile system exits the limited range of the signal source.

17. The mobile system of claim 16 wherein the signal source is a terrestrial broadcast source and the second interface is a satellite interface.

18. The mobile system of claim 15 further comprising a network interface coupled to the controller, and wherein the controller is further configured to transmit an instruction to record the at least a portion of the television program to a remotely-located video recorder via the network interface.

19. The mobile system of claim 15 further comprising a network interface coupled to the controller, and wherein the controller is further configured to transmit a request for the television program to a remotely-located placeshifting device and to receive a media stream of the television program via the network interface.

20. A mobile system for presenting a television program to a viewer on a display of the mobile system, the mobile system comprising:
 a programming interface configured to receive first, second and third signals transmitted by a first, a second and a third terrestrial broadcast source, respectively;
 a display interface configured to present the television program to the viewer on the display;
 a network interface configured to transmit and receive information on a digital network; and
 a controller coupled to the first programming interface, the display interface and the network interface, wherein the controller is configured to:
  determine a location of the first, second and third terrestrial broadcast source within an expected broadcast radius of the first, second and third terrestrial broadcast source;
  determine a limited range of the first, second and third terrestrial broadcast source within the expected broadcast radius of the first, second and third terrestrial broadcast source, the limited range defining a geographical outer limit and any geographic holes in broadcast coverage within the geographical outer limit of the first, second and third terrestrial broadcast sources;
  determine a geographic location of the mobile system based upon information contained in the first, second and third signals, to select a best source for the television program from the first, second and third signals and a direction of movement relative to the location of the first, second and third terrestrial broadcast source;
  determine, while receiving the television program via the signal transmitted by the signal source and while a signal strength of the best source for the television program from the first, second and third signals is above a predetermined threshold, whether the mobile system will exit the limited range of the terrestrial broadcast source selected as the best source for the television program based upon the determined geographic location, the location of the selected terrestrial broadcast source, the direction of movement relative to the location of the selected terrestrial broadcast source, and the expected broadcast radius of the selected terrestrial broadcast source; and
  facilitate an action to allow the viewer to continue to view the television program before the signal strength of the best signal source drops below the predetermined threshold, wherein the action is selected from changing the programming interface to receive the television program from another of the first, second and third signals, notifying the viewer that the mobile system is about to exit the limited range of the terrestrial broadcast source, and directing a remotely-located video recorder via the network interface to record at least a portion of the television program.

* * * * *